Patented June 5, 1928.

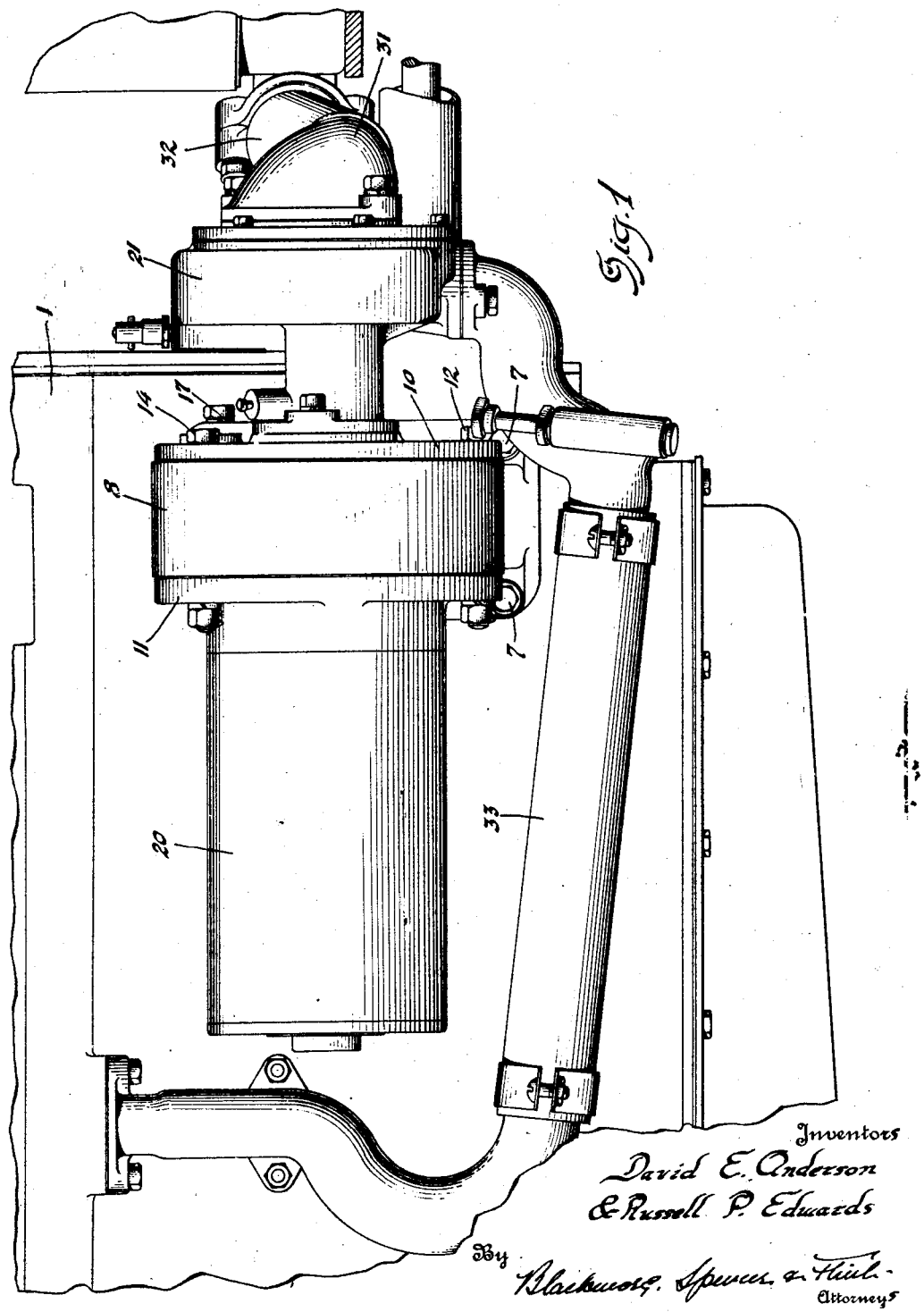

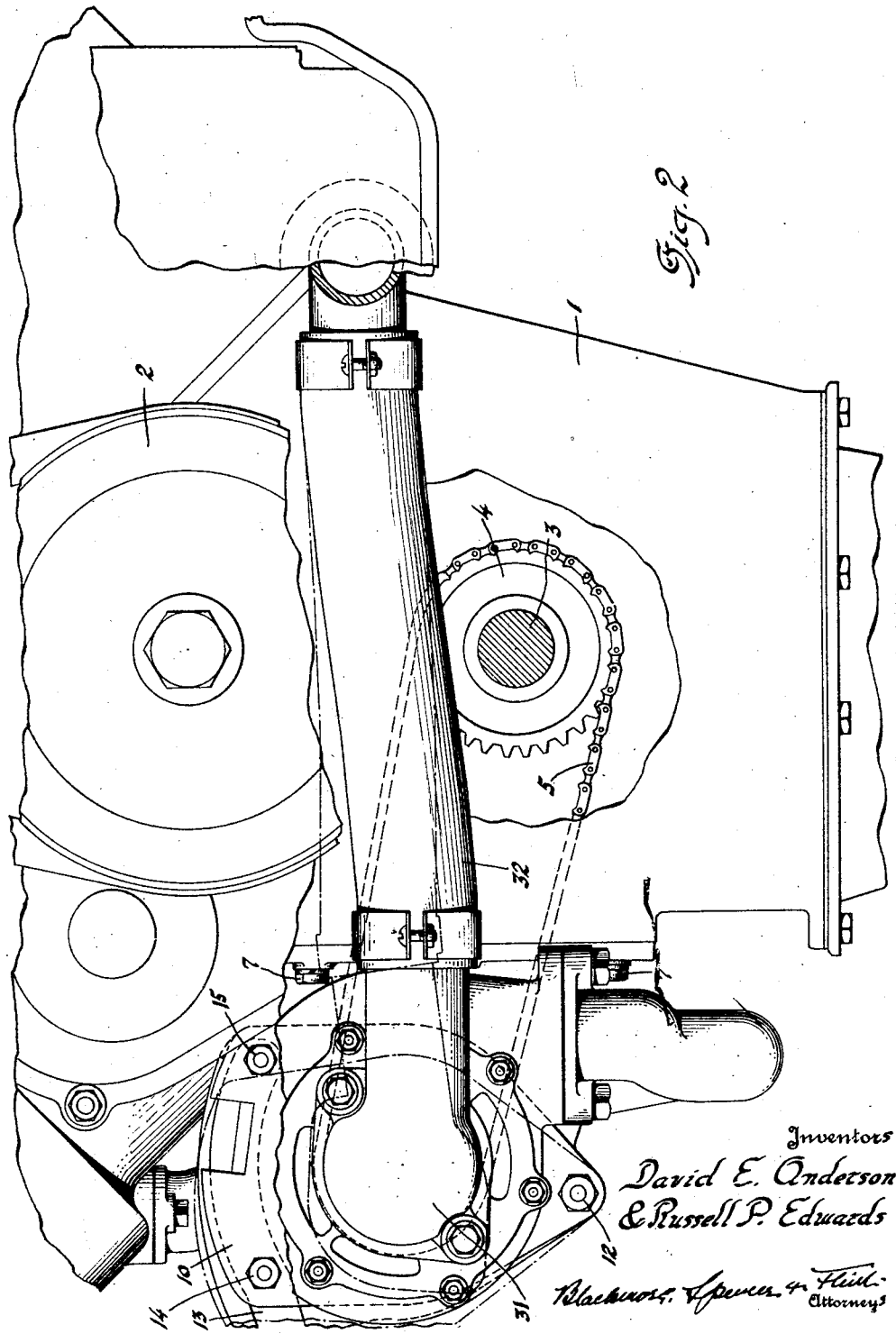

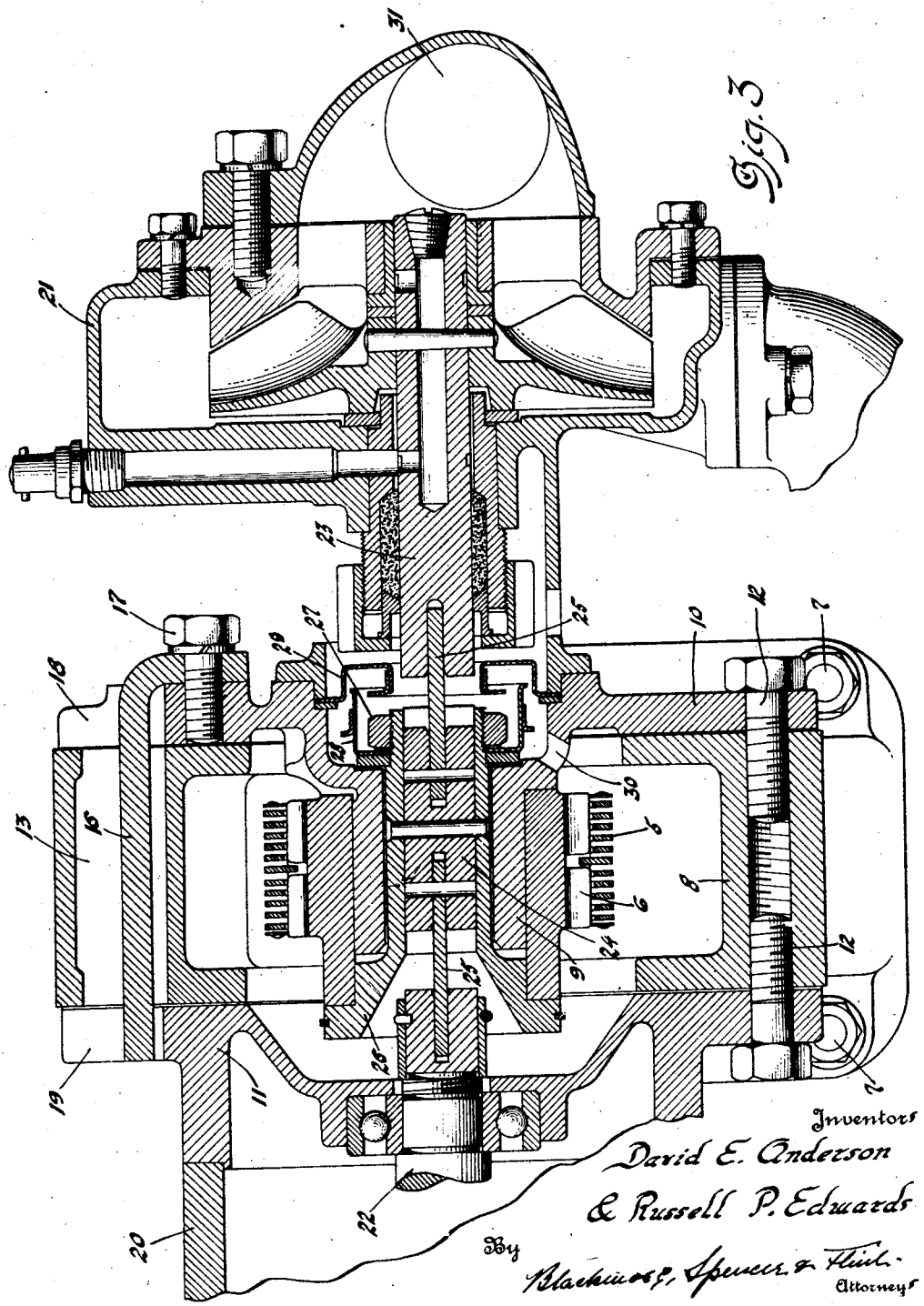

1,672,191

UNITED STATES PATENT OFFICE.

DAVID E. ANDERSON, OF DETROIT, AND RUSSELL P. EDWARDS, OF ROYAL OAK, MICHIGAN, ASSIGNORS TO GENERAL MOTORS CORPORATION, OF DETROIT, MICHIGAN, A CORPORATION OF DELAWARE.

WATER PUMP AND GENERATOR MOUNTING.

Application filed October 18, 1926. Serial No. 142,514.

This invention relates to mountings for accessories or adjuncts to an internal combustion engine, such as generators, water pumps, oil pumps, ignition timers and the like, and the driving connection for their operation.

It has been common practice to rotate a shaft for driving these devices, by means of a single chain connecting such shaft, the camshaft and crankshaft. After the chain is in use, it wears and stretches, becoming loose, and this slack results in back-lash. In the V-type of engine, wherein the cylinders are set on the crankcase at an angle of about ninety degrees, these motor adjuncts must be positioned below the cylinders at the side of the crankcase, so that their chain sprocket is nearly on a horizontal plane with the crankshaft, while the cam shaft sprocket is in a vertical plane. Therefore, only a very few teeth of the crankshaft driving sprocket engage the chain affording a poor driving connection or contact, and making it possible for a loose chain to come entirely off the crankshaft sprocket. The present construction contemplates a separate drive for the camshaft entirely independent of the accessories, and pivotally mounting two accessories such as a generator and water pump, the shafts of each being connected with a common sprocket driven from a sprocket on the crankshaft. The driving chain, therefore, engages a maximum number of teeth on the sprockets, and the pivotal adjustment of the accessories takes up the slack to maintain a tight chain.

In the drawing, illustrating a preferred embodiment of the invention, Figure 1 is a side elevation of a generator and water pump mounted on a bracket secured at one side of an explosive engine.

Figure 2 is a front elevation of a portion of a V-type of engine with the present drive arrangement.

Figure 3 is a vertical cross sectional view of the mounting bracket and the water pump and generator driving connection.

For illustrative purposes, the invention is shown as applied to a V-type of motor, indicated by reference character 1, although it is not limited to that type alone. At the front of the engine 1, (Figure 2) is a pulley 2, mounted on the camshaft from which a belt drives the usual radiator fan. The camshaft may be driven in any suitable manner from the crankshaft 3. A driving sprocket 4 on the crankshaft, is connected by the chain 5 with a driven sprocket 6 to operate the motor adjuncts as will be described.

To the side of the engine is fastened by bolts 7, a hollow mounting bracket or support 8, which houses the driven sprocket 6 and has a communicating opening with the interior of the crankcase for passage of the drive chain 5. A hub or inward extension 9 of the cover plate 10 provides a bearing on which the sprocket 6 rotates, the plate itself closing the front side of the bracket and the plate 11 closing the rear side. The two plates 10 and 11 are pivoted to the bottom of the bracket by the pins or bolts 12, while the upper end of the bracket has therein an arcuate slot 13, thru which extend a pair of studs or bolts 14 and 15, limiting the swinging movement of the plate about the pivot pins 12 within the range of the slot and securely holding the plates in their adjusted position. Also extending thru the slot 13 between the two pins 14 and 15, is a flat blade or key 16 having a downturned lip secured to the plate 10 by a screw threaded stud 17, the key resting in oppositely disposed slots 18 and 19 in the plates 10 and 11. This key and its engaging slots 18 and 19 are preferably machined accurately to rigidly maintain the plates 10 and 11 against relative side sway, so their movement about the common pivot is in absolute unison.

On the rear pivoted closure plate 11 is mounted the generator 20, and on the front pivoted closure plate 10 is mounted the water pump 21, both generator and pump shown, being of common well known types. The shaft 22 of the generator 20 and shaft 23 of the pump 21, are both detachably connected with the coupling shaft 24, each being provided with an end groove into which may slide a flexible finger 25, consisting of a number of flat spring blades riveted in a slot in the coupling shaft 24. This flexible connection between the shafts compensates for twisting strains and torque reactions, due to slight inaccuracies of manufacture and misalignment of the shafts. The coupling shaft 24 is riveted to the sleeve 26, which at one end has a driving connection with the sprocket 6 and at the other end is held in place by a screw threaded nut 27, which also holds in place the sheet metal cup member 28 cooperating with the member 29 to return any crankcase oil that may leak past the sprocket bearing, thru the hole 30 into the hollow bracket.

The inlet neck 31 of the water pump is provided with a flexible section of rubber hose 32 connecting with the bottom chamber of the water cooling radiator, while the outlet from the pump is connected by the flexible hose 33 to the engine water jacket.

With the use of flexible current conducting wires for the generator and the rubber hose connections for the pump, no resistance will be offered to the bodily movement of these parts by such conducting connections, as the plates are adjusted about their pivots to change the relation of the sprockets for regulating the driving chain.

The construction affords a compact arrangement with a minimum number of parts, of low manufacturing cost, and one which may be easily and quickly disassembled for inspection and repair. Either accessory may be removed from the side plate on which it is mounted, without affecting the other, the flexible finger 25 sliding out of the slot to permit separation of the shafts, or if it is desired to remove the accessories and side plates as units, the pivot bolts 12 and locking bolts 14 and 15 are removed. In such event, the slot 18 permits separation of the plate 11 from the alignment key 16, and the driving connection is broken by withdrawal of the generator shaft slot from its driving finger 25.

In the front elevation, Figure 2, the parts are shown in full lines at the inward limit of the pivoted adjustment in the slot of the mounting bracket, in contrast with the dot and dash lines outlining the parts in their outward limit, illustrating the range of movement for taking up slack to tighten the drive chain. The adjustment consists of loosening the bolts 14 and 15 to permit the unison bodily movement of the oppositely disposed plates and accessories carried thereby, which therefore, moves the driven sprocket in relation with the driving sprocket without changing the relation of the driven sprocket and accessory shafts. When the adjustment has taken out the looseness in the chain, the bolts 14 and 15 are once more tightened to lock the parts in position.

While the parts and arrangement have been described more or less specifically, it is to be understood that the invention is not limited to the exact details but such modifications may be made as come within the scope of the appended claims.

Having described the invention we claim:

1. In a device of the character described, the combination of a pair of motor adjuncts, common operating means therefor, including driving and driven elements, and a mounting on opposite sides of which said adjuncts are independently mounted for movement relative to the mounting, and means connecting said adjuncts for unison pivotal movement to adjust said driving and driven elements relative to each other.

2. In a device of the character described, the combination with a chain drive, including a sprocket, of a pair of motor adjuncts, on one of which said sprocket is mounted, drive connections between the sprocket and shafts of each motor adjunct, and a support on opposite sides of which the adjuncts are pivotally mounted one on each side for adjustment of the chain drive.

3. In a device of the character described, the combination of a crank case, an engine shaft therein, a pair of accessories having their shafts extending toward each other and connected together, an endless flexible connection between said connected shafts and the engine shaft, and a bracket carried by said crankcase on which said accessories are pivotally mounted for bodily adjustment to tighten said flexible connection.

4. In a device of the character described, the combination of a crankcase, an engine shaft therein, a supporting bracket at the side of said crankcase, a pair of motor adjuncts pivotally mounted on opposite sides of said bracket, a coupling for the shafts of said adjuncts, a driving connection between said coupling and the engine shaft, and means to hold said adjuncts together for unison bodily movement to adjust the driving connection.

5. In a device of the character described, the combination of a crankcase, an engine shaft therein, a driving element carried by the shaft, a mounting bracket at the side of said crankcase, a pair of adjuncts pivoted on opposite sides of said bracket, a driven element associated with the shafts of said adjuncts, an endless flexible drive connection between said driving and driven elements, and means to adjust said adjuncts in unison about their pivots to tighten the flexible drive connection.

6. In a device of the character described, the combination of a crankcase, an engine shaft therein, a driving element carried by the shaft, a mounting bracket at the side of said crankcase, a pair of plates pivoted on opposite sides of said bracket, means to connect said plates for unison pivotal adjustment, a motor adjunct carried by each plate, a driven element associated with the shafts of each adjunct, and an endless flexible drive connection between said driving and driven elements maintained in proper driving relation by the unison pivotal adjustment of said plates.

7. In a device of the character described, the combination of a pair of accessories having their shafts extending toward each other, a common operating means therefor including driving and driven elements and a continuous flexible drive connection, flexible joints between the driven element and each shaft, and a mounting on which said accessories have unison pivotal adjustment to move said driving and driven elements relative to each other to maintain the drive connection tightened.

8. In a device of the character described, the combination with a chain drive, including a sprocket, of a housing for said sprocket, a pair of plates pivotally mounted on said housing, on one of which said sprocket is revolubly carried, a key member tying the plates for unison pivotal adjustment, a motor adjunct carried by each plate, and a flexible drive connection between said sprocket and said motor adjuncts, whereby the pivotal movement of the two plates to adjust the chain drive does not affect the drive connection with the accessories.

9. In a device of the character described, the combination with a chain drive, including a sprocket, of a pair of motor adjuncts, on one of which said sprocket is revolubly mounted, a torque compensating drive connection between said sprocket and each shaft of said motor adjuncts, a bracket on which said adjuncts are pivotally mounted about the same axis for adjustment of the chain drive, and means to hold said adjuncts in alignment with each other.

10. In a device of the character described, the combination of a supporting bracket, a pair of accessories adjustably pivoted on opposite sides of said bracket about the same axis, means rigidly connecting the accessories together for unison pivotal adjustment, a driven element rotatably mounted upon one of said accessories, a flexible drive connection between said driven element and the respective shafts of each accessory, and a driving element having a fixed rotatable axis, said driving and driven elements being relatively movable upon adjustment of said accessories.

11. In a device of the character described, the combination of a fixed support, a pair of accessories on opposite sides of said support, a fixed pivot pin connecting the accessories at one end of the support, the opposite end of the support being provided with an arcuate slot having its center at the common pivot of said accessories, a pair of connecting pins extending thru the slot and fastening the accessories in their positions of adjustment, a key connecting the accessories for unison movement, common operating means for the two accessories consisting of a driving element having a fixed center of rotation, a driven element revolubly carried by one of the accessories and having torque compensating connections with the shafts of said accessories, and an endless drive member between the driving and driven elements, the adjustment of the accessories maintaining the parts in proper driving relation.

12. In a device of the character described, the combination of a crankcase, an engine shaft therein, a driving element carried by the shaft, a supporting bracket at the side of the crankcase, a pair of plates pivotally mounted on said bracket and having limited unison swinging movement, a driven element revolubly carried by one of said plates, a drive member between said elements, adjusted to proper driving connection by the swinging unison movement of the plates changing the relation of said elements, a motor adjunct detachably carried by each plate, and quick detachable driving connections between said common driven element and the respective shafts of each adjunct, whereby either of the respective adjuncts may be removed from its mounting without affecting the other.

13. In a device of the character described, the combination with a water pump and a generator, of common operating means therefor, including driving and driven elements, a mounting on which the water pump and generator have pivotal movement to adjust said operating means, and flexible water and electric current conducting connections for the water pump and generator respectively accommodating such pivotal movement.

14. In a device of the character described, the combination of a pair of motor adjuncts, driving and driven elements common to said adjuncts, a support on which said adjuncts are pivotally mounted on a common axis for swinging movement to adjust the driving and driven elements relative to each other, and means to hold said adjuncts in fixed positions of adjustment.

15. In a device of the character described, the combination of a pair of motor adjuncts, driving and driven elements common to said adjuncts, a support on opposite sides of which said adjuncts are independently mounted on a common pivotal axis, for swinging movement to adjust the driving and driven elements relative to each other, and means to key said adjuncts together for unison movement.

16. In a device of the character described, the combination of a pair of motor adjuncts, driving and driven elements common to said adjuncts, a support on opposite sides of which said adjuncts are independently mounted on a common pivotal axis, for swinging movement to adjust the driving and driven elements relative to each other, means to key said adjuncts together for unison movement, and other means to hold said adjuncts in fixed positions of adjustment.

17. In a device of the character described, the combination of a pair of motor adjuncts, driving and driven elements common to said adjuncts, a quickly detachable connection between one of said adjuncts and the driven element, a support, means to removably mount said adjuncts on a common pivotal axis and on opposite sides of the support, for swinging movement to adjust the driving and driven elements relative to each other, and a key for maintaining the movement of said adjuncts in unison, said key being carried on one adjunct and slidably engageable with a way formed in the other adjunct to permit the ready separation upon removal of either of said adjuncts from said support.

In testimony whereof we affix our signatures.

DAVID E. ANDERSON.
RUSSELL P. EDWARDS.